United States Patent
Chen et al.

(10) Patent No.: US 10,306,465 B2
(45) Date of Patent: *May 28, 2019

(54) PROTECTING SENSITIVE DATA IN A SECURITY AREA

(71) Applicant: International Business Machines Corporation, Armonk, NY (US)

(72) Inventors: Ye Chen, Shanghai (CN); Ruomeng Hao, Shanghai (CN); Ting Jiang, Shanghai (CN); Ning Wang, Shanghai (CN); Shu Xi Wei, Shanghai (CN); Youmiao Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,272

(22) Filed: Jul. 18, 2017

(65) Prior Publication Data
US 2017/0318459 A1 Nov. 2, 2017

Related U.S. Application Data

(63) Continuation of application No. 14/747,274, filed on Jun. 23, 2015, now Pat. No. 9,763,089.

(51) Int. Cl.
*H04L 29/06* (2006.01)
*H04W 12/04* (2009.01)

(52) U.S. Cl.
CPC .................... *H04W 12/04* (2013.01)

(58) Field of Classification Search
CPC ...................................... H04W 12/04
USPC .......................................... 713/171
See application file for complete search history.

(56) References Cited

U.S. PATENT DOCUMENTS

| | | | |
|---|---|---|---|
| 6,167,513 A | 12/2000 | Inoue et al. | |
| 6,212,280 B1* | 4/2001 | Howard, Jr. | G06F 21/602 380/279 |
| 6,735,630 B1* | 5/2004 | Gelvin | B60R 25/1004 706/33 |
| 6,845,318 B1* | 1/2005 | Moore | G01C 21/20 340/990 |
| 7,539,313 B1 | 5/2009 | Hardjono et al. | |
| 8,555,364 B2 | 10/2013 | Filippi et al. | |
| 8,694,795 B1 | 4/2014 | Aissi | |

(Continued)

OTHER PUBLICATIONS

Liao, H., et al, 'A New Data Encryption Algorithm Based on the Location of Mobile Users', Information Technology Jrnl., 2008, entire document, https://www.researchgate.net/publication/26557016_A_New_Data_Encryption_Algorithm_Based_on_the_Location_of_Mobile_Users/download.*

(Continued)

*Primary Examiner* — Luu T Pham
*Assistant Examiner* — Ronald Baum
(74) *Attorney, Agent, or Firm* — Alexis N. Hatzis

(57) ABSTRACT

Managing data security on a mobile device. Data associated with a mobile device is received; the data includes an identification (ID) of the mobile device and a location of the mobile device relative to one or more location sensor devices. A path is determined, relative to the one or more location sensor devices, through which the mobile device has traveled. An electronic security key is communicated to the mobile device based on determining that the path corresponds to a defined path associated with the mobile device.

17 Claims, 5 Drawing Sheets

(56) References Cited

U.S. PATENT DOCUMENTS

| | | | | |
|---|---|---|---|---|
| 9,036,509 | B1* | 5/2015 | Addepalli | H04W 4/046 370/259 |
| 9,479,898 | B2* | 10/2016 | Aratsu | H04W 4/02 |
| 2002/0098840 | A1 | 7/2002 | Hanson et al. | |
| 2002/0131602 | A1 | 9/2002 | Ishii | |
| 2002/0136407 | A1* | 9/2002 | Denning | G06F 21/10 380/258 |
| 2002/0143462 | A1 | 10/2002 | Warren | |
| 2002/0173907 | A1* | 11/2002 | Ando | G08G 1/20 701/410 |
| 2002/0176579 | A1 | 11/2002 | Deshpande et al. | |
| 2006/0288227 | A1* | 12/2006 | Kalofonos | H04L 12/2803 713/182 |
| 2007/0121503 | A1 | 5/2007 | Guo et al. | |
| 2007/0156912 | A1* | 7/2007 | Crawford | G07C 9/00031 709/229 |
| 2007/0157307 | A1 | 7/2007 | Katoh et al. | |
| 2007/0198826 | A1 | 8/2007 | Grosse | |
| 2008/0107075 | A1 | 5/2008 | Ramachandran et al. | |
| 2008/0319909 | A1* | 12/2008 | Perkins | G06Q 10/00 705/50 |
| 2010/0019920 | A1* | 1/2010 | Ketari | G08B 13/1427 340/686.6 |
| 2010/0070772 | A1* | 3/2010 | Nakamura | G01C 21/32 713/176 |
| 2010/0111294 | A1* | 5/2010 | Soppera | G06Q 10/08 380/28 |
| 2010/0245042 | A1 | 9/2010 | Tsubaki | |
| 2010/0266132 | A1 | 10/2010 | Bablani et al. | |
| 2011/0055572 | A1 | 3/2011 | Vogt et al. | |
| 2011/0119734 | A1* | 5/2011 | Crawford | G06F 21/34 726/3 |
| 2011/0138477 | A1* | 6/2011 | Jones | G06F 21/78 726/27 |
| 2011/0211701 | A1 | 9/2011 | Grall et al. | |
| 2012/0214441 | A1* | 8/2012 | Raleigh | G06Q 10/06375 455/406 |
| 2013/0013933 | A1 | 1/2013 | Adams et al. | |
| 2013/0051559 | A1 | 2/2013 | Baba | |
| 2013/0083919 | A1* | 4/2013 | Sobue | G06F 21/62 380/28 |
| 2014/0075493 | A1 | 3/2014 | Krishnan et al. | |
| 2014/0162598 | A1 | 6/2014 | Villa-Real | |
| 2014/0237627 | A1 | 8/2014 | Mylavarapu | |
| 2014/0257889 | A1* | 9/2014 | Ashley, Jr. | G06Q 10/063 705/7.11 |
| 2014/0279723 | A1* | 9/2014 | McGavran | G06N 99/005 706/11 |
| 2014/0331279 | A1 | 11/2014 | Aissi et al. | |
| 2015/0120550 | A1* | 4/2015 | Jung | G06Q 20/3224 705/44 |
| 2016/0226911 | A1* | 8/2016 | Boss | H04L 63/20 |
| 2016/0292687 | A1* | 10/2016 | Kruglick | G06Q 20/12 |
| 2016/0344729 | A1 | 11/2016 | Slaight et al. | |
| 2016/0380987 | A1 | 12/2016 | Chen et al. | |

OTHER PUBLICATIONS

Cho, Y., et al, 'Secure Access Control for Location-Based Applications in WLAN Systems', Proc. of the 3rd IEEE International Conference on Mobile Adhoc and Sensor Systems, Oct. 2006, entire document, https://www.ics.uci.edu/~goodrich/pubs/bao-chap.pdf.*

IBM: List of IBM Patents or Patent Applications Treated as Related (Appendix P), Jul. 18, 2017, pp. 1-2.

Prasanna et al., "A Generalized Study on Encryption Techniques for Location Based Services", www.iosrjournals.org, vol. 16, Issue 4, Ver. III (Jul.-Aug. 2014), pp. 19-26.

Mell et al., "The NIST Definition of Cloud Computing, National Institute of Standards and Technology" Special Publication 800-145, Sep. 2011, pp. 1-7.

Hamad, H., et al, 'Data encryption using the dynamic location and speed of mobile node', Journal Media and Communication Studies vol. 2(3)pp. 067-075, Mar. 2010, pp. 1-9, http://www.academicjournals.org/article/article1382008750_Hammad%20and%20Elkourd%202.pdf.

Li, G., et al, 'A Robust on-Demand Path-Key Establishment Framework via Random Key Predistribution for Wireless Sensor Networks', EURASIP Journal on Wireless Communications and Networking vol. 2006, Article ID 91304, pp. 1-10, DOI 10.1155/WCN/2006/91304, http://www.utdallas.edu/-weiliwu/NSF_report/KeyEstabTZ_Eurasip.pdf.

Liao, H., et al, 'A New Data Encryption Algorithm Based on the Location of Mobile Users', Information Technology Journal 7 (1): 63-69, 2008, https://www.cyut.edu.tw/-hcliao/seafood/papers/20071123-ITJ-7(1)-63-69.pdf.

* cited by examiner

US 10,306,465 B2

PROTECTING SENSITIVE DATA IN A SECURITY AREA

BACKGROUND

Embodiments of the invention generally relate to data security, and more particularly to software security on mobile devices.

As mobile devices gain wider use in personal and enterprise settings, the risk of improper dissemination of confidential information increases. Currently, mobile devices to lack effective local data protection measures.

SUMMARY

An embodiment of the invention provides a method for managing data security on a mobile device. The method receives data associated with a mobile device; the data includes an identification (ID) of the mobile device and a location of the mobile device relative to one or more location sensor devices. The method determines a path, relative to the one or more location sensor devices, through which the mobile device has traveled, and communicates an electronic security key to the mobile device based on determining that the path corresponds to a defined path associated with the mobile device.

A further embodiment of the invention provides a computer system for managing data security on a mobile device. The computer system includes a processor and a tangible non-transitory storage device. The storage device stores a program having instructions for execution by the processor. The instructions implement a method that receives data associated with a mobile device; the data includes an identification (ID) of the mobile device and a location of the mobile device relative to one or more location sensor devices. The method determines a path, relative to the one or more location sensor devices, through which the mobile device has traveled, and communicates an electronic security key to the mobile device based on determining that the path corresponds to a defined path associated with the mobile device.

A further embodiment of the invention provides a computer program product for managing data security on a mobile device. The compute program product includes a non-transitory storage medium storing program code, the program code including instructions for execution by a processor of a computer to implement a method. The method receives, by the processor, data associated with a mobile device; the data includes an identification (ID) of the mobile device and a location of the mobile device relative to one or more location sensor devices. The method determines, by the processor, a path, relative to the one or more location sensor devices, through which the mobile device has traveled, and communicates, by the processor, an electronic security key to the mobile device based on determining that the path corresponds to a defined path associated with the mobile device.

DETAILED DESCRIPTION

Figure 1:
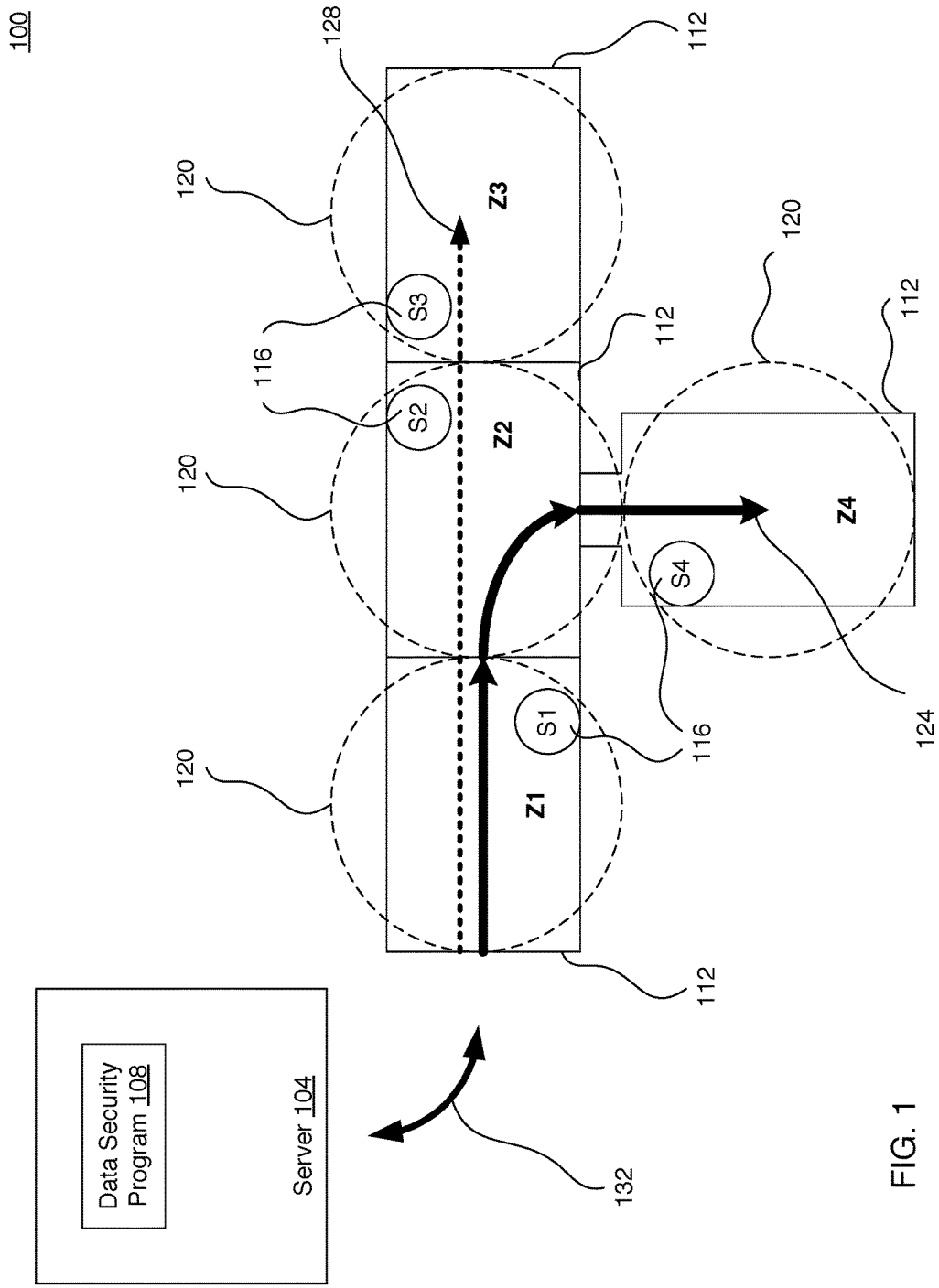
FIG. 1 is a block diagram of a system for managing data security on a mobile device, according to an aspect of the invention.

FIG. 1 depicts a mobile security environment 100, according to an embodiment of the invention. Mobile security environment 100 includes a server 104 containing a data security program 108, one or more locations 112, and one or more location sensor 116 devices, having detection zones 120. Mobile security environment 100 may further include one or both of authorized path 124 and unauthorized path 128. Each of these components is described in greater detail below.

Server 104 may be a computing device having a processor and a tangible storage device for storing data security program 108. Data security program may include a set of instructions executable by the processor. Server 104 and data security program 108 generally may include functionality to manage mobile data security in mobile security environment 100. Server 104 may be in close physical proximity to other components of mobile security environment 100 (for example, to location sensors 116), or may be remotely connected to them via, for example, a cloud service, through connection 132 (connection 132 may include one or more connectivity devices or systems such as, for example, WiFi and Bluetooth, over networks such as LAN, WAN, or the Internet or a cloud computing environment).

Locations 112 may include, for example and without limitation, physical land, buildings, rooms, hallways, floors, or other physical locations. Locations 112 may correspond to various locations associated with security requirements. In one example, locations 112 may be rooms in a building where access and security are controlled. Locations 112 may have the same or different security needs. A user of a mobile device may travel through one or more of locations 112 while carrying the mobile device. As the user travels through locations 112, the user may travel through one or more paths, including, for example, path 124 (denoted by a solid line) and path 128 (denoted by a dotted line). In one embodiment, the user's path through locations 112 may correspond to an authorized path or an unauthorized path. Whether the user has traveled through an authorized path may be tracked. Based on whether the user has traveled through an authorized path, the user may be granted or denied access to secured data on the mobile device. The user's access to secured data may be revoked upon the user taking an exit path, or the user leaving a location where the access was previously granted.

Mobile security environment may include one or more location sensors 116 placed in or near locations 112 to detect the presence and movement of a mobile device within one or more detection zones 120. Each location sensor 116 may detect a mobile device within its respective detection zone 120. Location sensors 116 may communicate with server 104 via connection 132 to notify server 104 of the mobile device's presence or absence from respective detection zones 120. In one example, as shown in FIG. 1, location sensors 116 may be installed in respective locations 112 and may include sensors S1, S2, and S3, each having a detection zone Z1, Z2, and Z3, respectively. In this example, path 124 may be an authorized path for a user (not shown) and may pass through Z1, Z2, and Z4. Path 128 may be an unauthorized path for the user and may pass through Z1, Z2 and Z3.

Path 124 and path 128 are two travel paths along which a mobile device may be detected, according to an example described in greater detail in connection with method 200 (FIG. 2), described below.

One or more mobile devices may be registered with server 104 as authorized mobile devices. Authorized devices may be eligible for receiving a security key to encrypt data to be stored on, or decrypt data already stored on, the authorized mobile device. In one embodiment, an authorized mobile device may receive a security key when it is determined the authorized mobile device is detected as being in a secured location, and when it is determined that the authorized mobile device has traveled through an authorized path to arrive at the secured location. In one embodiment, this may be the only scenario in which the security key is communicated to the authorized mobile device.

Figure 2:
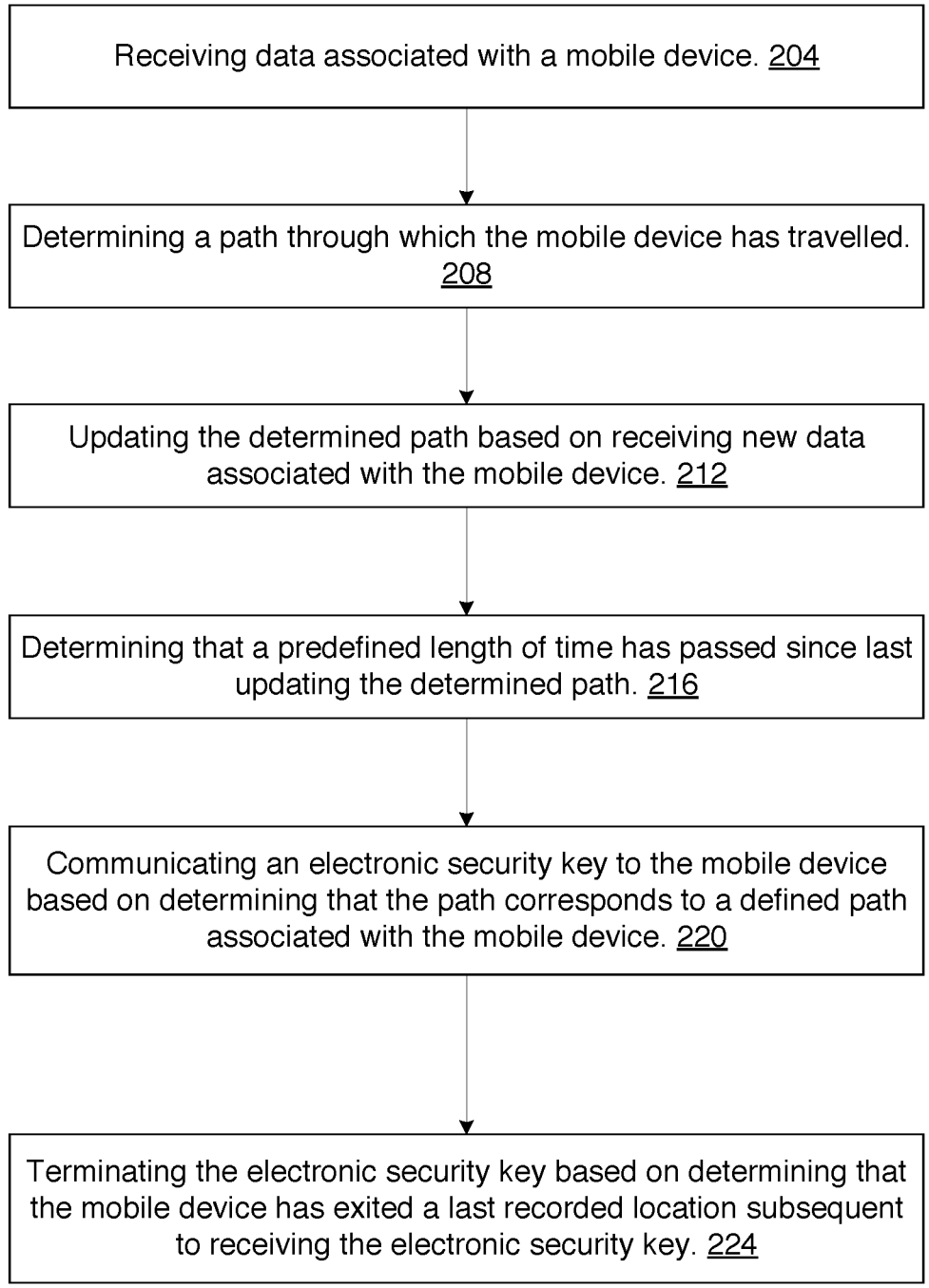
FIG. 2 is a flowchart of a method of managing data security on a mobile device, according to an aspect of the invention.

FIG. 2 is a flowchart of a method 200 for managing data security on a mobile device, according to an embodiment of the invention. Method 200 may be implemented via one or more instructions in a computer program, such as data security program 108 (FIG. 1). A computer processor (for example, a processor of server 104 in FIG. 1) may execute the computer program's instructions.

Referring now to FIGS. 1 and 2, location sensor S1 may detect a mobile device (not shown) entering detection zone Z1 and receive data associated with the mobile device (step 204). For example, S1 may receive the mobile device's identification (ID) information (such as an ID code). S1 may communicate, and server 104 may receive, the ID and location information associated with the mobile device.

Server 104 may determine a path through which the mobile device has traveled (step 208) by analyzing the information received from S1, as well as any path data previously associated with the mobile device. Where there is no previous traveled path data associated with the mobile device, server 104 may create a corresponding record in its database. The record may be created to include the mobile device's ID and its currently detected location. In the example where the mobile device travels along authorized path 124, the record may be created to include the following when the mobile device is first detected by S1 in Z1.

| DEVICE_ID | DEVICE_PATH |
|---|---|
| 12345 | Z1 |

A variety of additional data may be collected by S1, and optionally by one or more additional sensors. This additional data also may be added to the record associated with the mobile device. It may include, for example, time stamp, speed of travel, authorization status, number and manner of deviations from an authorized path, and other information.

If a record already exists for the mobile device, server 104 may update the determined path associated with the mobile device based on newly received data (step 212). For example, S1 may detect the mobile device travelling through Z1 and may communicate the information to server 104. Server 104 may receive the information (step 204) and create a corresponding record as described above (step 208). At some time after S1 detects the mobile device entering Z1, S2 may detect the mobile device entering Z2 (S1 may also detect that the mobile device is no longer in Z1, although this is not necessary). S2 may communicate this information to server 104. Server 104 may receive this information (step 204) and update the determined path for the mobile device based on the additional information received from S2 (step 212).

Server 104 may periodically query records associated with the user device to determine whether the user device has remained in a given detection zone 120 for longer than a defined threshold period without its location being updated (step 216). The threshold value may be defined arbitrarily (for example, 30 seconds) or based on one or more factors, such as the average time it takes to travel through a particular location 112. The threshold value may be defined differently for each location 112 and its corresponding detection zone 120. In one example, server 104 may receive data from S1 and S2 indicating that the mobile device has traveled through Z1 and Z2. Server 104 may update the mobile device's record to include "Z1→Z2" in the DEVICE_PATH field. Server 104 may additionally receive data from S4 that the mobile device has entered Z4, and may update the DEVICE_PATH field to "Z1→Z2→Z3". After the threshold time elapses (for example, 30 seconds) without server 104 receiving another update, server 104 may determine that the mobile device is no longer travelling between detection zones 120, and that it has remained in its last recorded detection zone 120, i.e., Z4.

Server 104 may analyze the mobile device's traveled path to determine whether it corresponds to an authorized path associated with the mobile device, and may communicate an electronic security key to the mobile device upon a positive finding (step 220). If server 104 determines that the travel path is unauthorized, it may take no action (i.e., not communicate the security key to the mobile device), or it may generate a security alert (for example, it may communicate the generated security alert to a system administrator). Server 104 may communicate the key to the mobile device via any known method in the art, including, without limitation, through one or more intermediary devices such as the location sensors 116. In one embodiment, server 104 may communicate the security key to the mobile device via the location sensor 116 in the last recorded detection zone 120 for the mobile device. This is one way in which server 104 can prevent communication of the security key to the mobile device if the mobile device exits the detection zone 120 before server 104 receives data indicating that the mobile device has moved. Continuing with the above example where server 104 determines that the mobile device has traveled along the path "Z1→Z2→Z4" and further determined that 30 seconds have elapsed since the mobile device last moved to a new detection zone 120, server 104 may compare the mobile device's traveled path to one or more authorized paths for the mobile device. For example, server's 104 database may include authorized path 124, which is defined as "Z1→Z2→Z4". In this example, server 104 determines that the mobile device's traveled path "Z1→Z2→Z4" is identical to authorized path 124. Server 104 may determine, therefore, that the mobile device is authentic and may communicate the security key to the mobile device via location sensor S4.

In another example, server 104 may receive information indicating that the mobile device has traveled through unauthorized path 128, defined as "Z1→Z2→Z3", and that the mobile device has not exited Z3 for 30 seconds or more. Server 104 may compare unauthorized path 128 to its database of authorized paths for the mobile device, and may determine that path 128 is an unauthorized path for the mobile device. Server 104 may take no action (i.e., not send the security code to the mobile device). In addition, or alternatively, server 104 may generate and communicate an alert message to a system administrator.

Server 104 may determine, subsequent to communicating the security key to the mobile device, that the mobile device has exited a last recorded detection zone 120 subsequent to server 104 communicating the electronic security key (step 224). The exit by the mobile device may be an indication that the mobile device is no longer in an authorized location and should no longer have access to confidential data. Continuing with the above example, where the mobile device travels along authorized path 124 ("Z1→Z2→Z4"), server 104 may receive a communication from S4 that the mobile device is no longer within Z4. Alternatively, or in addition, server 104 may receive a communication from any of the other location sensors 116 that the mobile device has moved into one or more of their respective detection zones 120. Server 104 may terminate the security code as a result of receiving this communication.

In various embodiments of the invention, the key communicated by server 104 to the mobile device may a key for encrypting and/or decrypting information stored on or accessed by the mobile device. For example, the mobile device may first receive the security key from server 104 to encrypt data on the mobile device at a time when the mobile device is authenticated (for example, when server 104 has determined that the mobile device has traveled along an authorized path). Thereafter, server 104 may revoke the security key, and may reactivate it or issue a new security key only after determining that the mobile device has returned to a secure location and traveled along an authorized path to get there.

In various embodiments, the security key may be updated based on, relative to the mobile device, data corresponding to one or more of speed of movement, frequency of remaining stationary, and length of time of remaining stationary.

Figure 4:
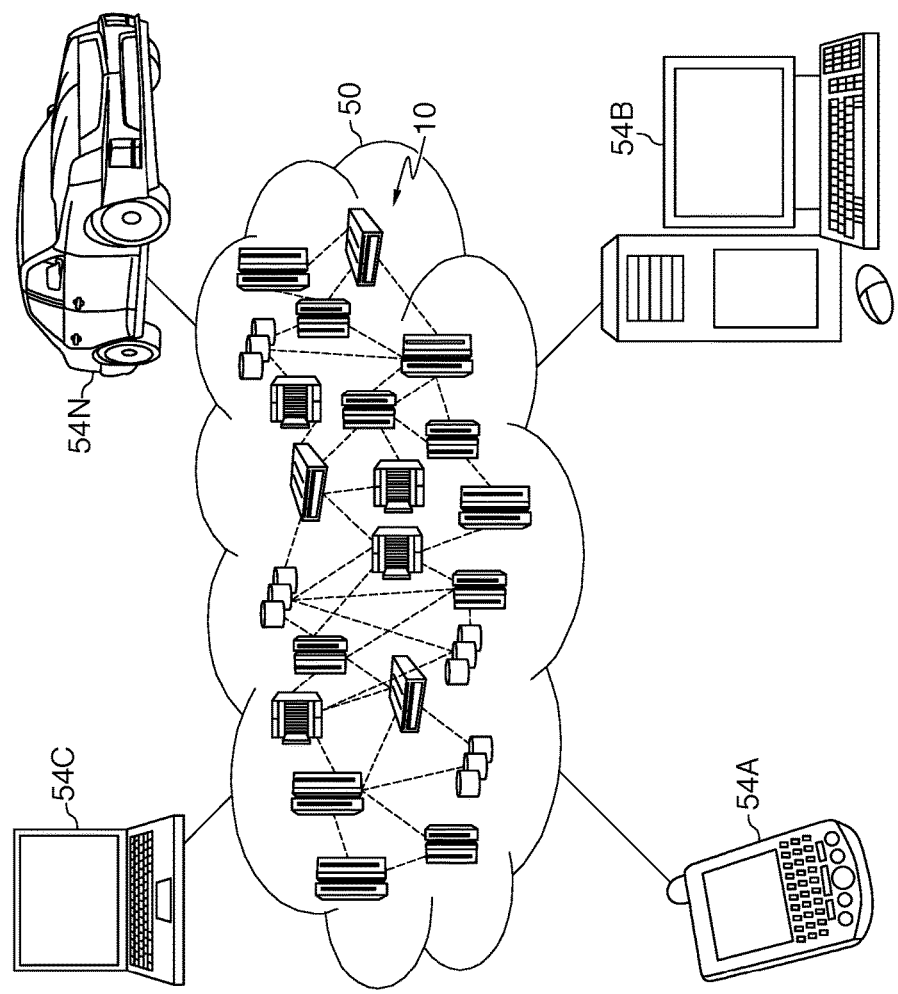
FIG. 4 a block diagram of a cloud computing environment, according to an aspect of the invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
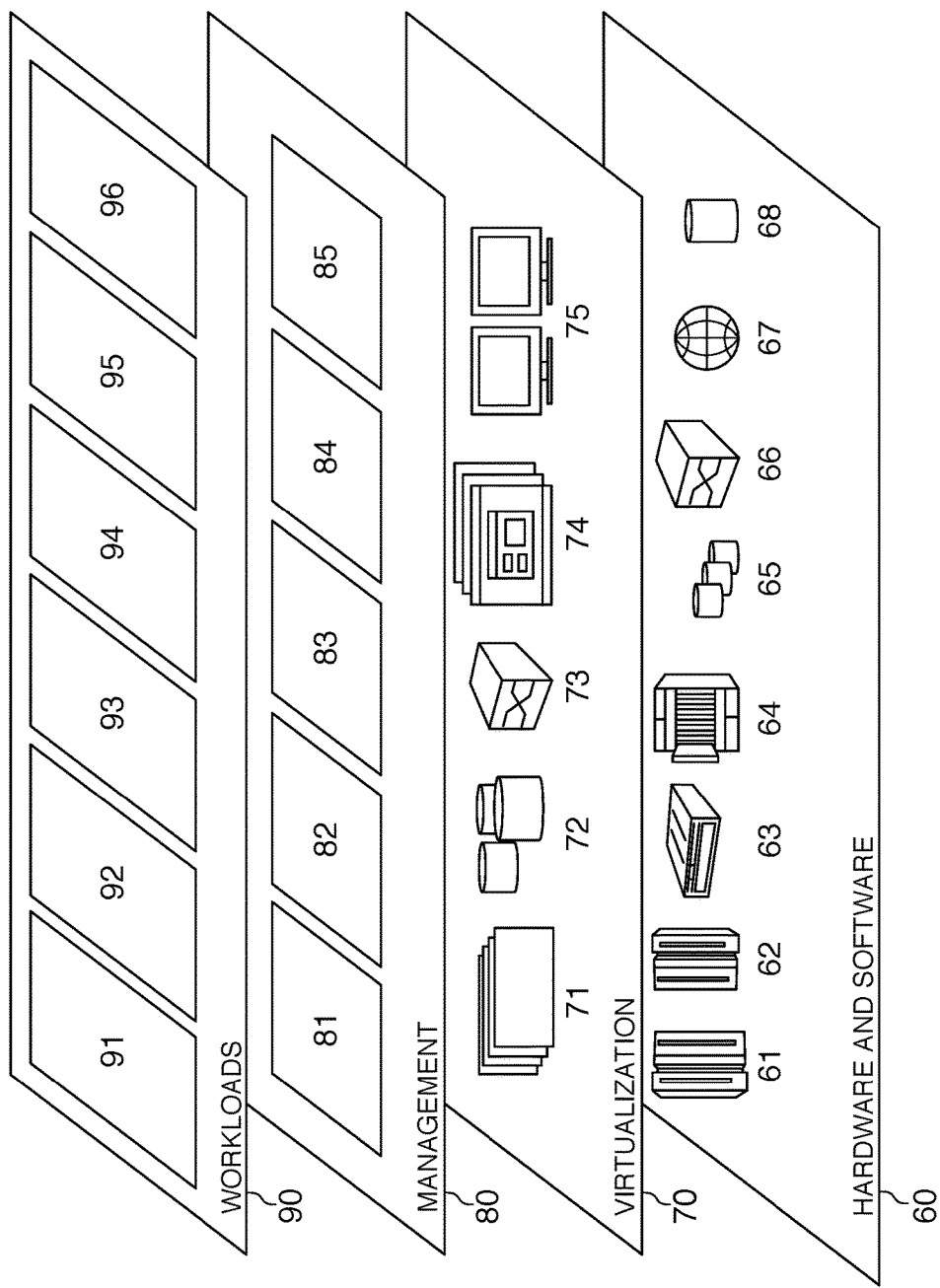
FIG. 5 is a block diagram of functional layers of the cloud computing environment of FIG. 4, according to an aspect of the invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that cloud computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 3:
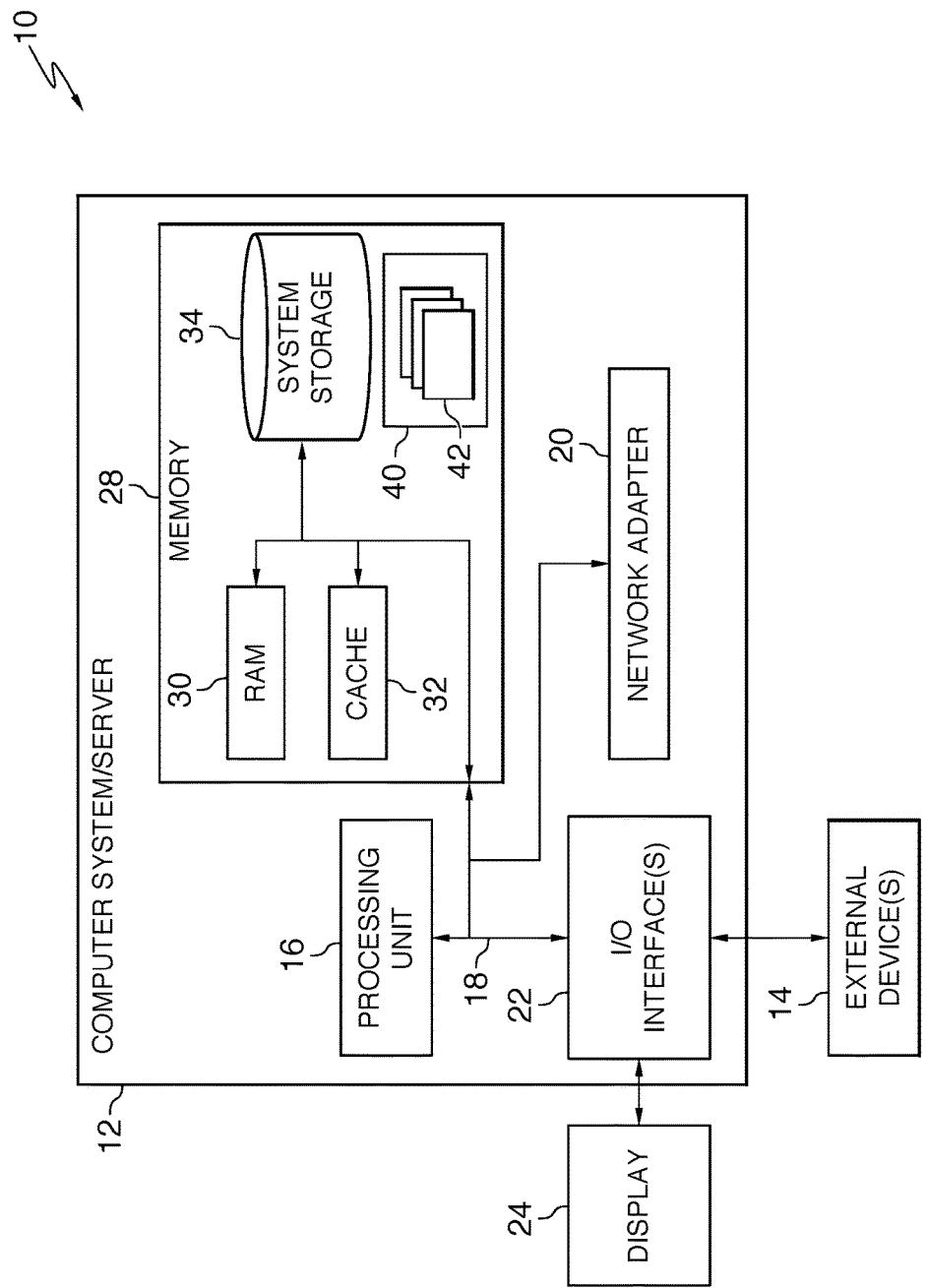
FIG. 3 is a block diagram of an exemplary computer system/server, according to an aspect of the invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; managing data security on a mobile device 96, including those described in connection with FIGS. 1-3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing data security on a mobile device, comprising:
   receiving data associated with a mobile device, the data comprising an identification (ID) of the mobile device and a location of the mobile device relative to one or more location sensor devices;
   determining a path, relative to the one or more location sensor devices, through which the mobile device has traveled;
   communicating an electronic security key to the mobile device based on determining that the path corresponds to a defined path associated with the mobile device;
   updating the electronic security key based on a length of time remaining stationary;
   receiving a communication from one or more location sensors that the mobile device has left a secure location;
   generating an alert message to a system administrator;
   reactivating a revoked electronic security key based on determining that the mobile device has returned to the secure location; and
   invalidating the electronic key based on determining that the mobile device is not registered based on querying a registration database.

2. The method of claim 1, further comprising:
   updating the determined path based on receiving new data associated with the mobile device, the new data comprising the ID of the mobile device and a new location of the mobile device relative to the one or more location sensor devices.

3. The method of claim 2, wherein communicating the electronic security key to the mobile device is performed after determining that a predefined length of time has passed since last updating the determined path.

4. The method of claim 1, further comprising:
   appending an electronic record associated with the mobile device in an electronic table to include information comprising one or more of the ID of the mobile device, the location of the mobile device, and a timestamp associated with the location of the mobile device.

5. The method of claim 1, further comprising: updating the electronic key to include one or both of the received data and new data associated with the mobile device, the new data comprising the ID of the mobile device and a new location of the mobile device relative to the one or more location sensor devices.

6. The method of claim 1, wherein the electronic security key is one or both of:
   an encryption key, whereby the mobile device encrypts data, prior to storing the data on a storage device of the mobile device, using the electronic security key; and
   a decryption key, whereby the mobile device decrypts data stored on a storage device of the mobile device using the electronic security key.

7. The method of claim 1, wherein determining the path further comprises:
   receiving data corresponding to, relative to the mobile device, one or more of speed of movement, frequency of remaining stationary, and length of time of remaining stationary.

8. A computer system for managing data security on a mobile device, comprising:

a computer device having a processor and a tangible storage device; and a program embodied on the storage device for execution by the processor, the program having a plurality of program instructions comprising program instructions for:

receiving data associated with a mobile device, the data comprising an identification (ID) of the mobile device and a location of the mobile device relative to one or more location sensor devices;

determining a path, relative to the one or more location sensor devices, through which the mobile device has traveled;

communicating an electronic security key to the mobile device based on determining that the path corresponds to a defined path associated with the mobile device;

updating the electronic security key based on a length of time remaining stationary;

receiving a communication from one or more location sensors that the mobile device has left a secure location;

generating an alert message to a system administrator;

reactivating a revoked electronic security key based on determining that the mobile device has returned to the secure location; and invalidating the electronic key based on determining that the mobile device is not registered based on querying a registration database.

9. The computer system of claim 8, wherein the program instructions further comprise instructions for:

updating the determined path based on receiving new data associated with the mobile device, the new data comprising the ID of the mobile device and a new location of the mobile device relative to the one or more location sensor devices.

10. The computer system of claim 9, wherein the program instructions for communicating the electronic security key to the mobile device are executed after executing the program instructions for determining that a predefined length of time has passed since last updating the determined path.

11. The computer system of claim 8, wherein the program instructions further comprise instructions for:

appending an electronic record associated with the mobile device in an electronic table to include information comprising one or more of the ID of the mobile device, the location of the mobile device, and a timestamp associated with the location of the mobile device.

12. The computer system of claim 8, wherein the electronic security key is one or both of:

an encryption key, whereby the mobile device encrypts data, prior to storing the data on a storage device of the mobile device, using the electronic security key; and a decryption key, whereby the mobile device decrypts data stored on a storage device of the mobile device using the electronic security key.

13. A computer program product for managing data security on a mobile device, comprising a non-transitory tangible storage device having program code embodied therewith, the program code executable by a processor of a computer to perform a method, the method comprising:

receiving data associated with a mobile device, by the processor, the data comprising an identification (ID) of the mobile device and a location of the mobile device relative to one or more location sensor devices;

determining a path, relative to the one or more location sensor devices, through which the mobile device has traveled;

communicating an electronic security key to the mobile device based on determining that the path corresponds to a defined path associated with the mobile device;

updating the electronic security key based on a length of time remaining stationary;

receiving a communication from one or more location sensors that the mobile device has left a secure location;

generating an alert message to a system administrator;

reactivating a revoked electronic security key based on determining that the mobile device has returned to the secure location; and invalidating the electronic key, by the processor, based on determining that the mobile device is not registered based on querying a registration database.

14. The computer program product of claim 13, wherein the method further comprises:

updating the determined path, by the processor, based on receiving new data associated with the mobile device, the new data comprising the ID of the mobile device and a new location of the mobile device relative to the one or more location sensor devices.

15. The computer program product of claim 14, wherein communicating the electronic security key to the mobile device is performed, by the processor, after determining, by the processor, that a predefined length of time has passed since last updating the determined path.

16. The computer program product of claim 13, wherein the method further comprises:

appending an electronic record associated with the mobile device in an electronic table, by the processor, to include information comprising one or more of the ID of the mobile device, the location of the mobile device, and a timestamp associated with the location of the mobile device.

17. The computer program product of claim 13, wherein the electronic security key is one or both of:

an encryption key, whereby the mobile device encrypts data, prior to storing the data on a storage device of the mobile device, using the electronic security key; and a decryption key, whereby the mobile device decrypts data stored on a storage device of the mobile device using the electronic security key.

* * * * *